8 Sheets—Sheet 1.
J. McALLISTER.
Sewing-Machine.
No. 220,164. Patented Sept. 30, 1879.
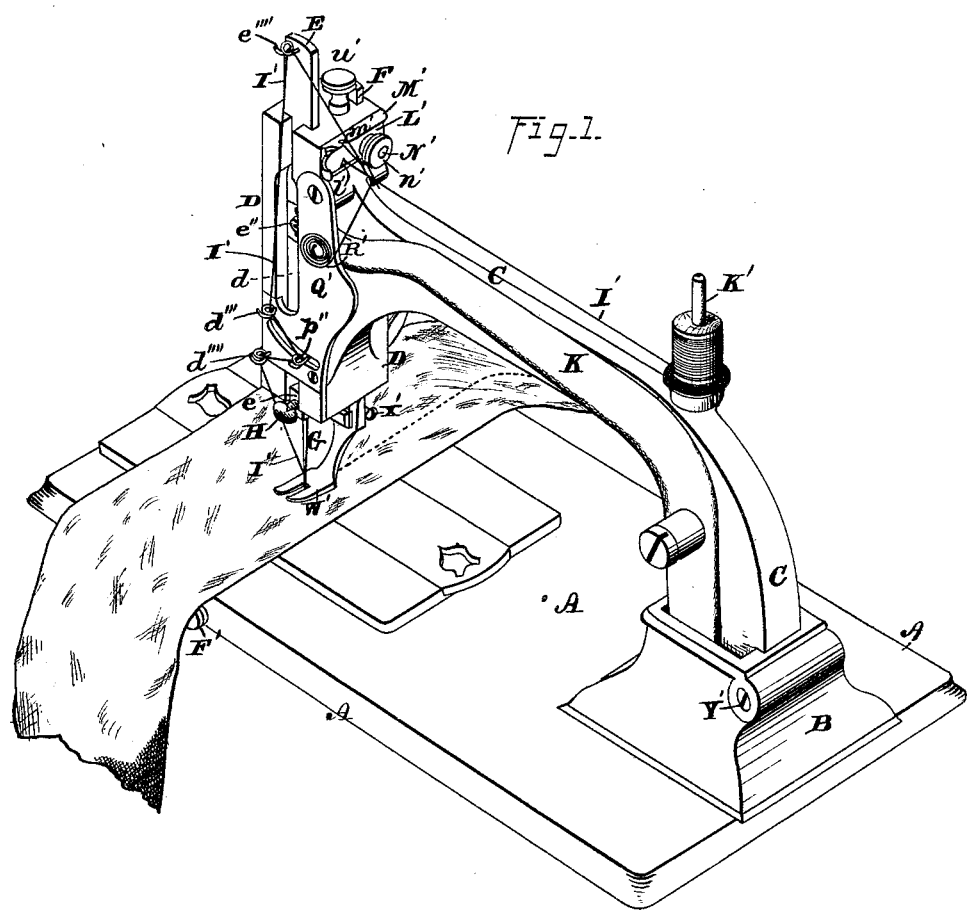

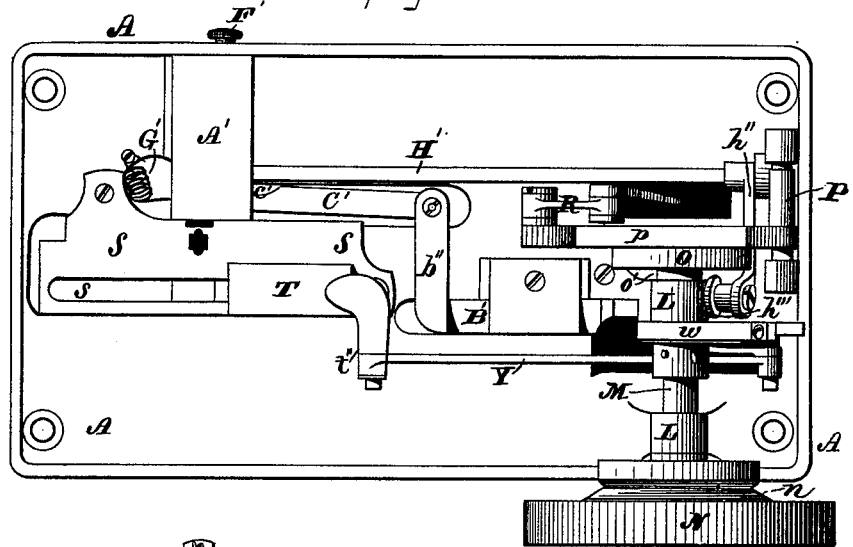
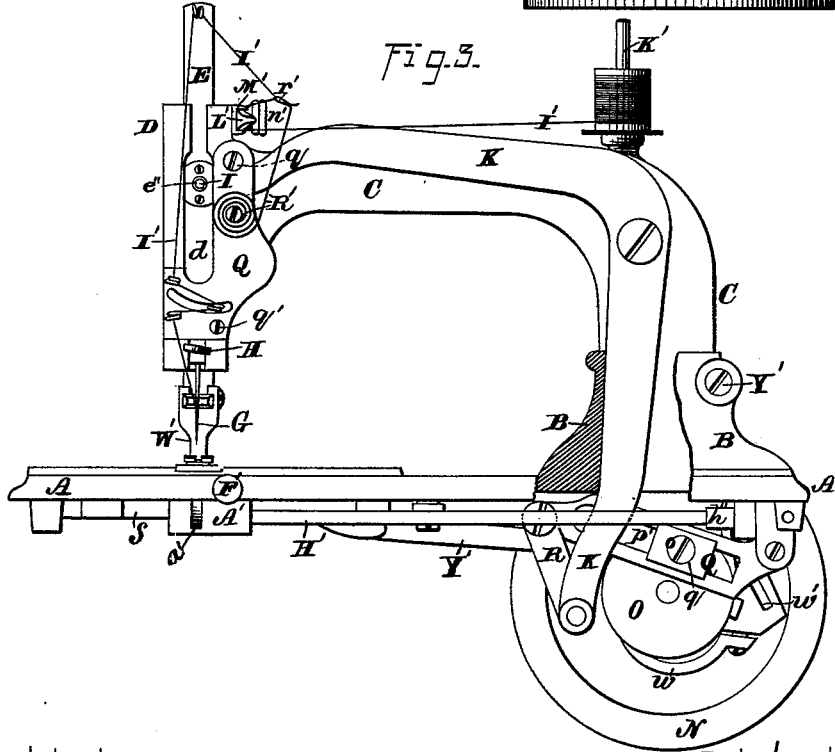

J. McALLISTER.
Sewing-Machine.
No. 220,164. Patented Sept. 30, 1879.
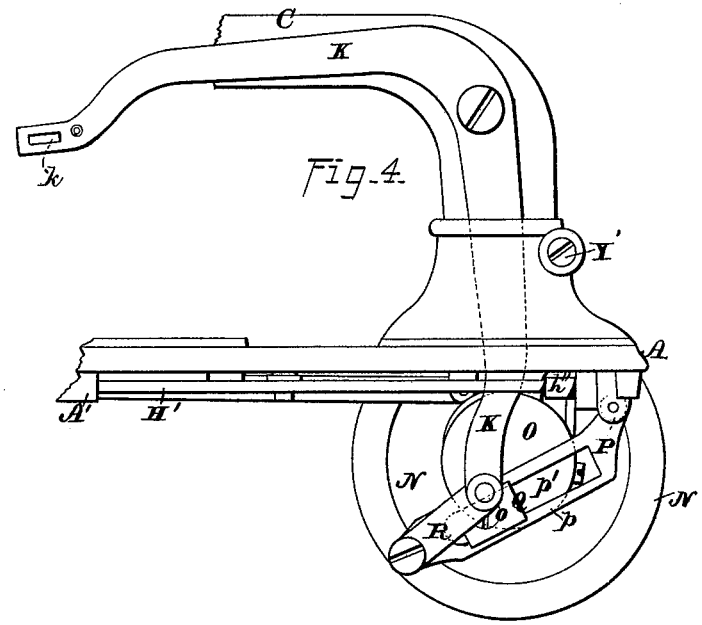
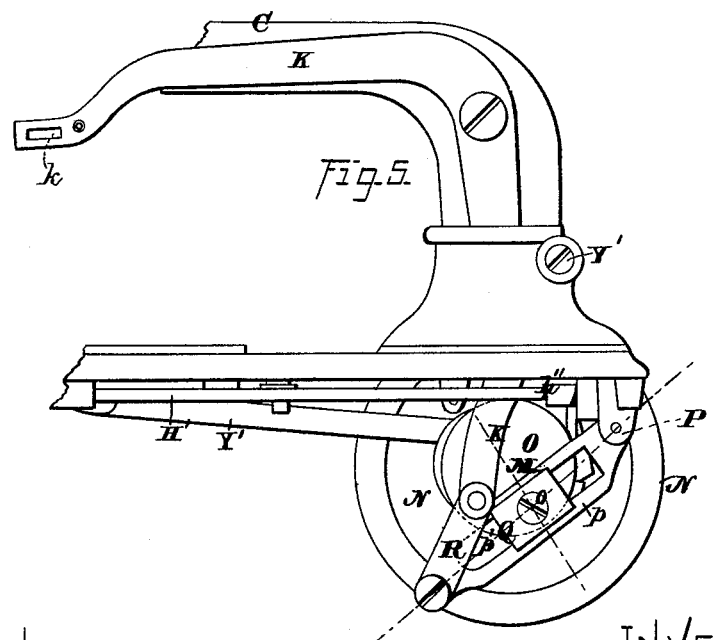

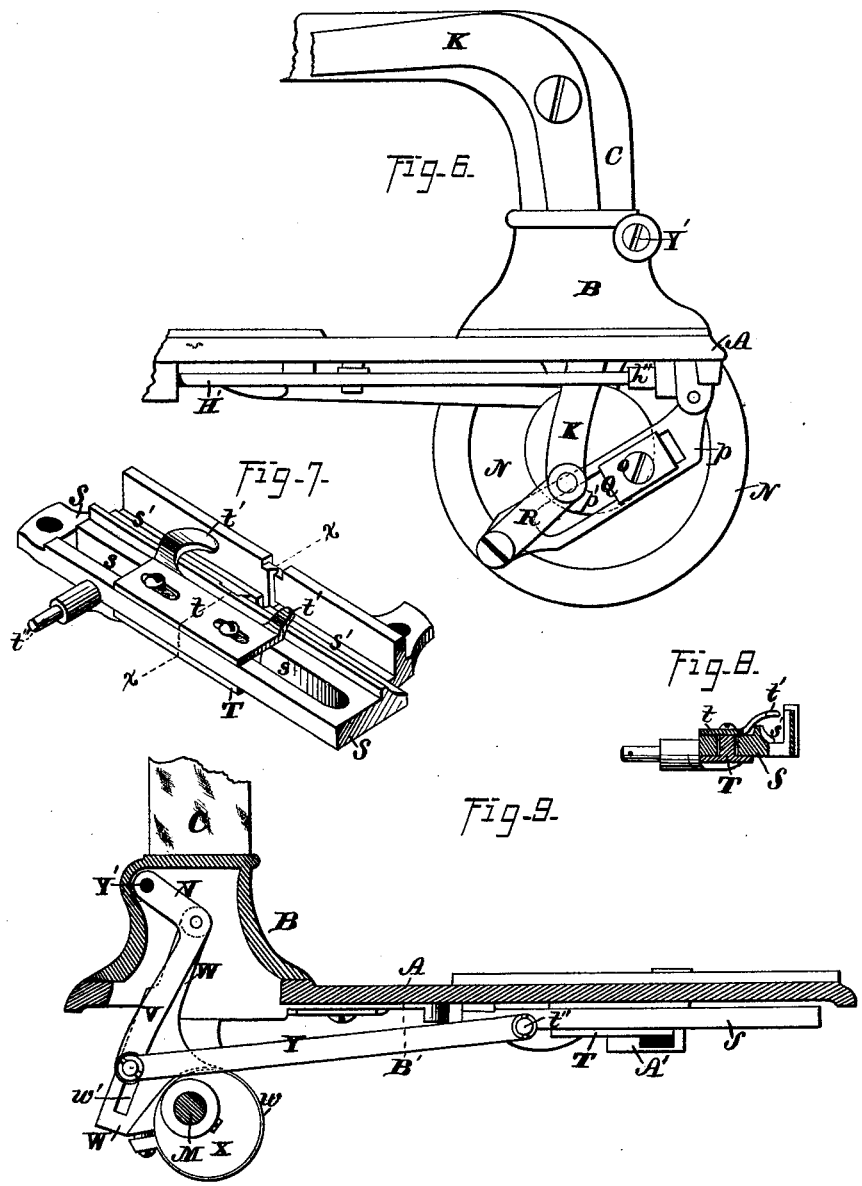

J. McALLISTER.
Sewing-Machine.

No. 220,164. Patented Sept. 30, 1879.

8 Sheets—Sheet 6.

J. McALLISTER.
Sewing-Machine.

No. 220,164. Patented Sept. 30, 1879.

J. McALLISTER.
Sewing-Machine.

No. 220,164.   Patented Sept. 30, 1879.

8 Sheets—Sheet 7.

WITNESSES:
Jas. E. Hutchinson.
Henry C. Hazard.

INVENTOR.
Jas. McAllister, by
Prindle and Russell his Attys

N. PETERS, PHOTO-LITHOGRAPHER, WASHINGTON, D. C.

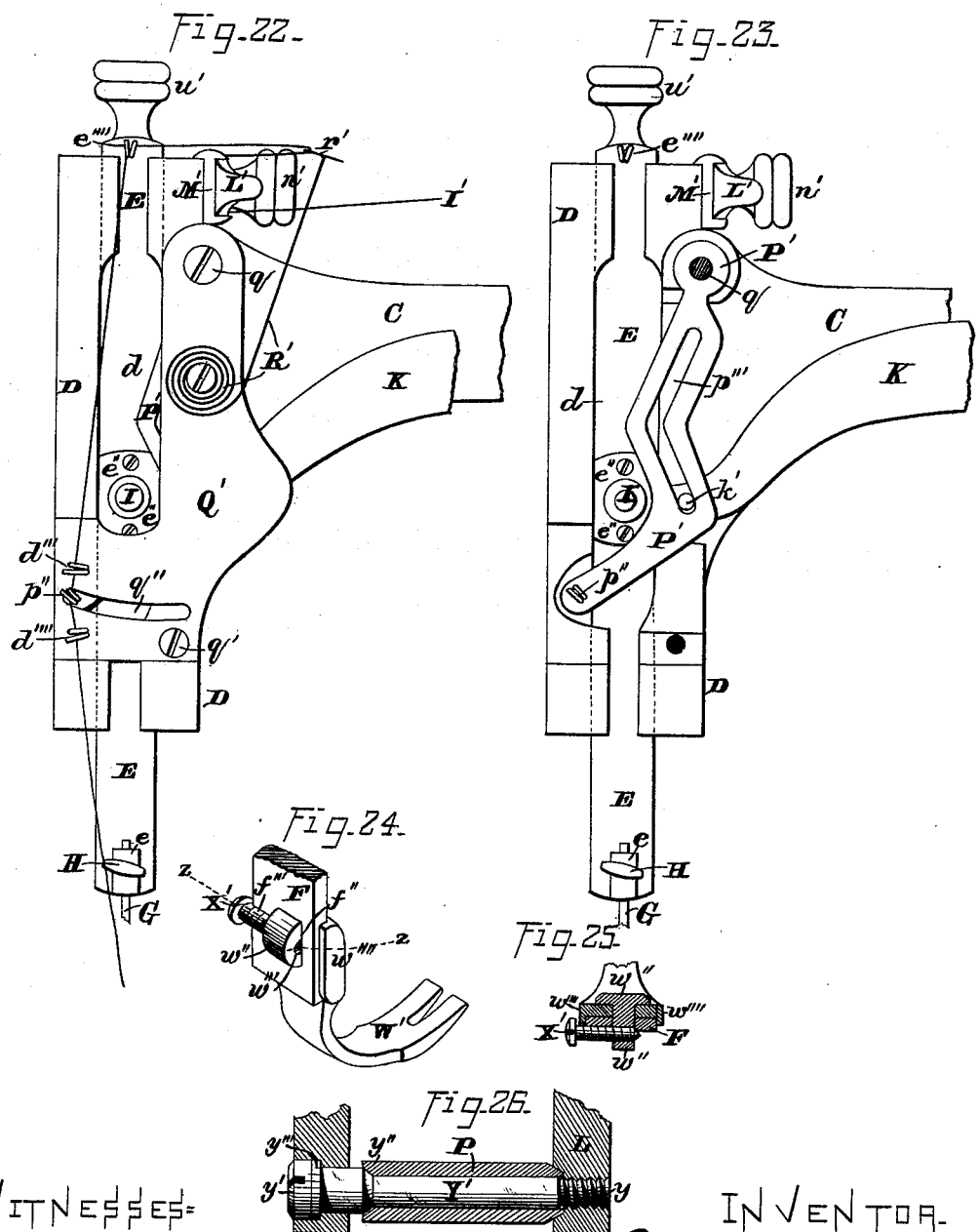

UNITED STATES PATENT OFFICE.

JAMES McALLISTER, OF CHICAGO, ILLINOIS, ASSIGNOR TO JOHN H. ROLFE, OF SAME PLACE.

IMPROVEMENT IN SEWING-MACHINES.

Specification forming part of Letters Patent No. 220,164, dated September 30, 1879; application filed September 7, 1878.

*To all whom it may concern:*

Be it known that I, JAMES McALLISTER, of Chicago, in the county of Cook, and in the State of Illinois, have invented certain new and useful Improvements in Sewing-Machines; and do hereby declare that the following is a full, clear, and exact description thereof, reference being had to the accompanying drawings, making a part of this specification, in which—

Figure 10:
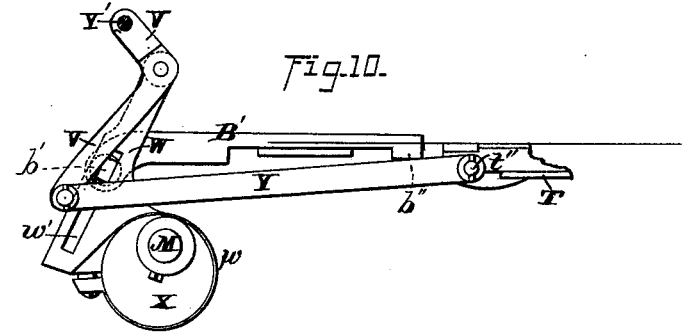
Figure 11:
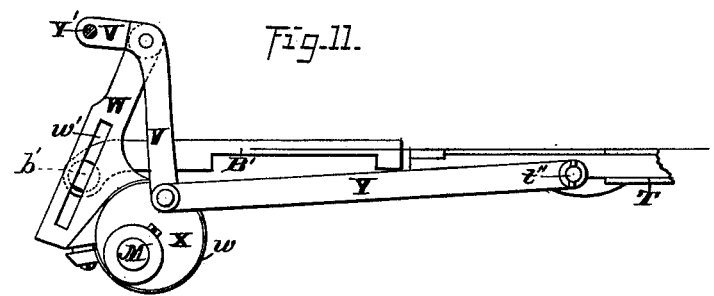
Figure 12:
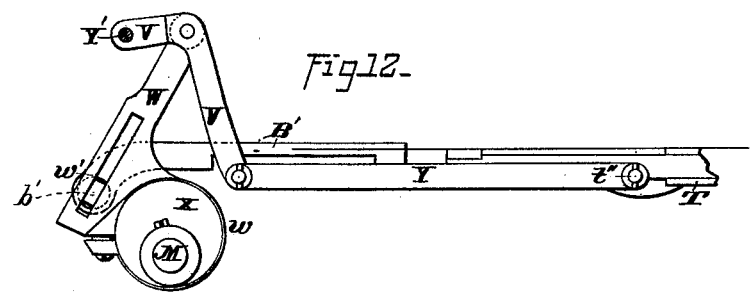
Figure 13:
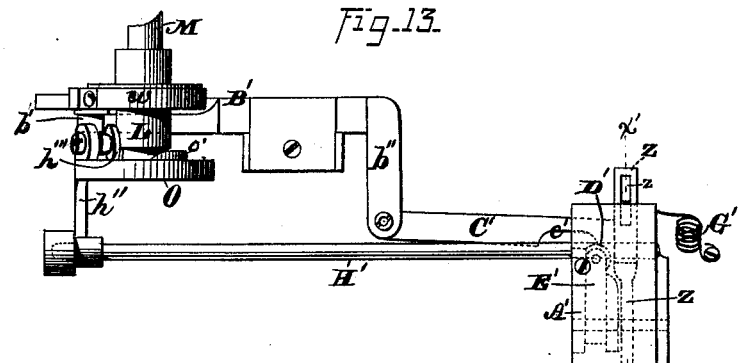
Figure 14:
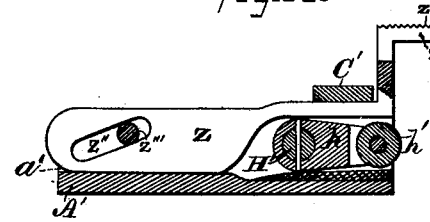
Figure 15:
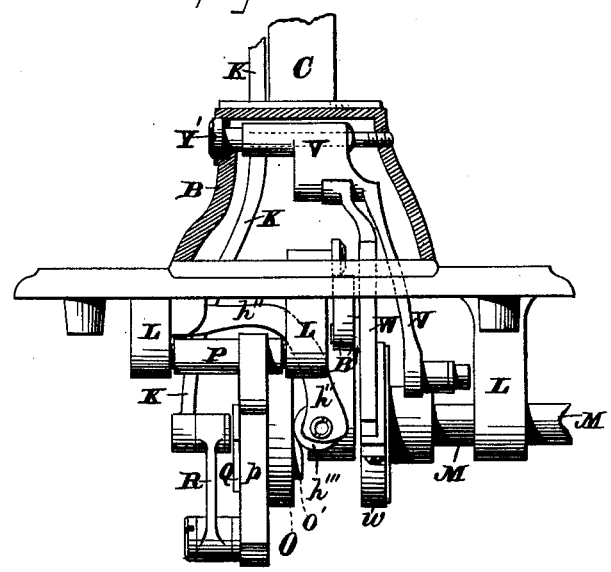
Figure 16:
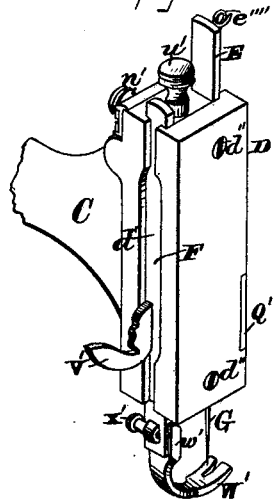
Figure 17:
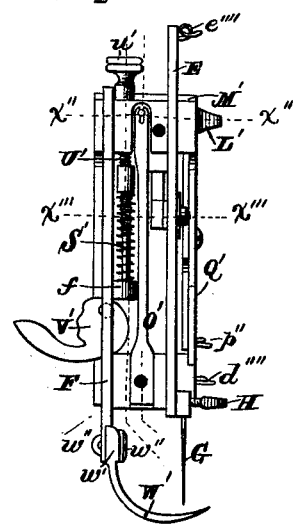
Figure 18:
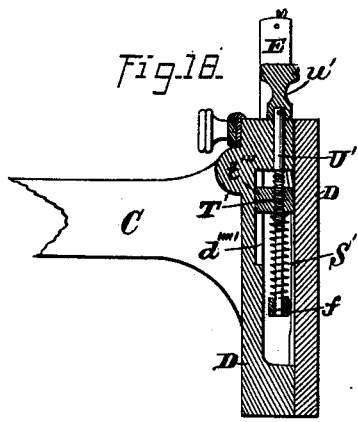
Figure 19:
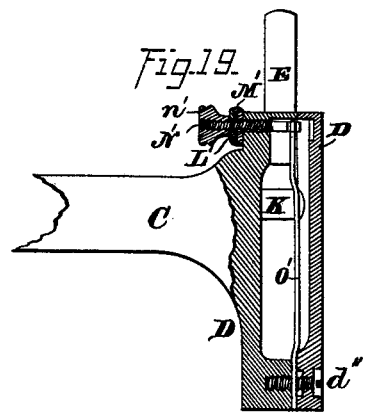
Figure 20:
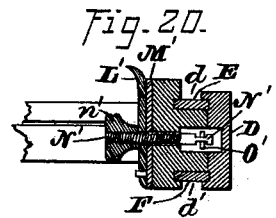
Figure 21:
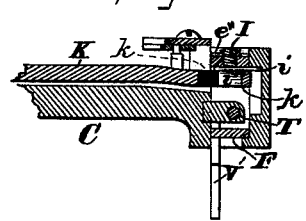

Figure 1 is an isometrical view of the top of my machine as in use. Fig. 2 is an inverted plan of the same. Fig. 3 is an elevation of the front side, a portion of the stationary arm being removed. Figs. 4, 5, and 6 are side elevations of the mechanism employed for operating the needle-bar, and show, respectively, the position of parts when said needle-bar has first reached its lowest point, when it has been raised to slacken the thread, and when it has again returned to its lowest position. Fig. 7 is an isometrical view of the shuttle-race and carrier separated from the machine. Fig. 8 is a cross-section of said parts upon line $x\ x$ of Fig. 7. Fig. 9 is a central longitudinal section of the base-plate, and shows, in side elevation, the rear side of the mechanism employed for operating the shuttle-carrier. Figs. 10, 11, and 12 are like views of said mechanism at different points of the movement of said shuttle-carrier. Fig. 13 is a plan view of the lower side of the mechanism for operating the feed-bar. Fig. 14 is a section upon line $x'\ x'$ of Fig. 13. Fig. 15 is an elevation of the rear end of the machine, the stationary arm being broken away so as to show the operating mechanism. Fig. 16 is an isometrical view of the head, showing the rear side of the same. Fig. 17 is an elevation of said head, the front section being removed so as to afford a view of the interior. Figs. 18 and 19 are, respectively, vertical sections of the head upon lines passing through the presser-bar screw and the tension-spring. Figs. 20 and 21 are horizontal sections of said head upon lines $x''\ x''$ and $x'''\ x'''$, respectively, of Fig. 17. Fig. 22 is a side elevation of the housing or head containing the needle-bar, take-up, &c. Fig. 23 is a like view of the same, the covering-plate being removed so as to show the construction of the take-up. Fig. 24 is an isometrical view of the presser-foot and the lower end of the presser-bar, and shows the means employed for connecting the same together. Fig. 25 is a horizontal section of the same upon line $z\ z$ of Fig. 24; and Fig. 26 is a section of one of the bearings of the machine, and shows the means employed for compensating for end wear.

Letters of like name and kind refer to like parts in each of the figures.

The object of my invention is to increase the efficiency and lessen the expense of a sewing-machine; and to this end it consists, principally, in the means employed for operating the vibrating arm, substantially as and for the purpose hereinafter specified.

It consists, further, in the means employed for operating the shuttle-carrier, substantially as and for the purpose hereinafter shown.

It consists, further, in the means employed for imparting longitudinal motion to the feed-bar, substantially as and for the purpose hereinafter set forth.

It consists, further, in the means employed for imparting vertical motion to the feed-bar, substantially as and for the purpose hereinafter shown and described.

It consists, further, in the means employed for regulating the length of the stitch, substantially as and for the purpose hereinafter specified.

It consists, further, in the means employed for giving pressure to the tension-plate, substantially as and for the purpose hereinafter shown.

It consists, further, in the construction of and mechanism for operating the take-up, substantially as and for the purpose hereinafter set forth.

It consists, further, in the means employed for applying spring-pressure to the presser-bar, substantially as and for the purpose hereinafter shown and described.

It consists, further, in the means employed for connecting the presser-foot to or with the presser-bar, substantially as and for the purpose hereinafter specified.

In the annexed drawings, A represents the base-plate of my machine, from one end of which, at its transverse center, extends upward a square hollow boss, B, that vertically decreases in horizontal dimensions from its lower to its upper end. From the upper end of the boss B, at one side of its transverse center, an arm, C, extends in a curve upward and forward, and thence horizontally forward nearly to the front end of the base-plate A, and at its forward end is provided with a housing or head, D, that, within its front and rear sides, is provided with vertical grooves $d$ and $d'$, which, respectively, receive the needle-bar E and presser-bar F, each of which bars is formed of a flat rectangular bar of steel.

For convenience of construction, the head D is formed in two parts, which separate upon a vertical central line that has a right angle to the line of the fixed arm C. The rear section is permanently attached to and forms part of said fixed arm, while the outer section is secured in place by means of two screws, $d''$, which pass through the same and have their inner threaded ends contained within correspondingly-threaded openings in said rear or fixed section.

The lower end of the needle-bar E is provided at its front side with a boss, $e$, through which is a vertical opening that receives a needle, G, while at its front side said boss has a threaded opening, which receives a thumb-screw, H, that operates to confine said needle in place.

At or near the longitudinal center of the needle-bar E, upon its front side, is a cylindrical boss, $e''$, through which and through said bar is provided a round opening that receives a correspondingly-shaped stud, I, that loosely fills the same. Immediately in rear of said needle-bar the stud I has an enlargement, $i$, while upon the rear side of such enlargement is provided a boss, $i'$, which, vertically, has about the dimensions of said stud, and, in a line with the fixed arm C, has considerably-increased dimensions, and from said enlargement projects rearward a distance about equal to the length of said stud.

The needle-bar E is caused to reciprocate vertically by means of an arm, K, which has the general form of a right angle, and is pivoted, near the intersection of its arms, to or upon the side of the fixed arm C, as shown, and at its front end extends into a recess which is formed within the rear side of the head D, where said end is provided with a slot, $k$, that engages with the boss $i'$.

If, now, the arm K be caused to oscillate upon its pivotal bearing, the needle-bar E will be moved vertically within the head D, during which movement the stud I will turn within said needle-bar, as said vibrating arm changes its angle, while the boss $i'$ will slide back and forth within the slot $k$, as the end of said arm moves in the arc of a circle.

Motion is imparted to the vibrating arm K by the following-described mechanism: Journaled horizontally within suitable bearings L and L, beneath and at a right angle with the length of the base-plate A, is a shaft, M, which is provided upon its rear end with a balance-wheel, N, and band-pulley $n$, and upon its opposite end, which terminates at or near the transverse center of said base-plate, has secured a circular plate or disk, O.

Journaled in rear of and somewhat higher and parallel with the shaft M is a short shaft, P, which extends from the front end of the former toward the front side of the base-plate A, and is provided with an arm, $p$, that extends radially forward against or nearly against the disk O.

Extending longitudinally within the arm $p$ is a slot, $p'$, which has parallel sides and receives and contains a square block, Q, that loosely fills said slot, and is capable of being moved freely within the same. A screw-pin, $o$, passing through a round opening, $q$, at the center of said block, has its inner threaded end contained within a correspondingly-threaded opening in the disk O, and when the latter revolves with the shaft M, moves said block in a circle, and causes said arm $p$ to vibrate vertically, during which operation said block slides back and forth within its slot $p'$ a distance equal to the diameter of the circle described by it.

The lower end of the vibrating arm K extends downward to or slightly below the axis of the shaft M, and is connected with the outer end of the arm $p$ by means of a short bar, R, which has its ends pivoted upon said parts K and $p$, as shown in Figs. 3, 4, 5, and 6. If, now, the shaft M is caused to revolve, the movements of the pivoted arm $p$ will, by means of the bar R, cause the vibrating arm K to oscillate upon its pivotal bearing and to move the needle-bar E vertically within its head.

In Fig. 3 is shown the position of the operative mechanism when the needle-bar is at its highest point.

The sliding block Q exerts least power upon the needle-arm K as said block nears the rear end of the slot $p'$ of the arm $p$, but when said parts occupy such position the needle-bar E is at or near the upper limit of its motion, the take-up P'' is at rest, and but little power is required to move said needle-bar.

As the sliding block Q moves away from the pivotal bearing of the arm $p$ toward the outer end of the slot $p'$, the needle-bar E descends and requires a constantly-increasing moving power, which increase of power is supplied by said block Q and crank-pin $o$, their effective force being augmented as they near the outer end of said arm $p$, until the maximum is attained as the needle G passes through the fabric being operated upon, the relative positions of parts being shown in Fig. 4, said block Q being at the outer end of said slot $p'$, and the said crank-pin $o$ substantially in line with the pivotal axes of the bar R.

From the position shown in Fig. 4, the downward and rearward motion of the crank-pin $o$ causes the needle to rise and loosen the thread, so as to enable the shuttle to more easily pass through the loop, which rise continues until said pin is in a line radially having a right angle to a line passing through the axis of the shaft P and the pivotal connection between the end of the arm $p$ and the lower end of the bar R, as seen by the interrupted lines in Fig. 5; after which the further movement of said crank-pin causes said needle to again descend until, as shown in Fig. 6, said crank-pin is in line with the pivotal axis of said bar R, when a further movement carries said needle upward to the position first described.

In addition to the advantage obtained by thus adapting the power of the operating mechanism to the requirements of the needle, the construction described causes the latter to descend and pass through the cloth at a moderate velocity, and to rise rapidly after having done its work, whereby the durability and efficiency of the said operative mechanism are materially enhanced.

The shuttle-race, as seen in Figs. 7 and 8, consists of a plate, S, having a vertical longitudinal slot, $s$, and at one side of the same, within its upper side, is provided a shuttle-groove, $s'$. Within the slot $s$ slides the carrier T, which is composed of a flanged block that embraces the lower face of the shuttle-race S and extends upward through the slot $s$, and a plate, $t$, that is secured upon the upper side of said block, extends over the upper face of said shuttle-race, and at each end is provided with an arm, $t'$, which extends over the groove $s'$ and engages with one end of an ordinary shuttle. Said plate $t$ is secured upon said block by means of screws which pass through elongated openings and enable said plate to be adjusted lengthwise, so as to adjust the position of the shuttle with relation to the needle. The shuttle-race S is secured to or upon the lower side of the base-plate by means of suitable screws.

The shuttle-carrier is driven by means of the following-described mechanism: Pivoted within the upper end, at the rear side of the boss B, at the side opposite to the needle-arm K, is a lever, V, which has a long and a short arm that have nearly a right angle to each other, the short arm being uppermost. Pivoted at the angle of the lever V is one end of a bar, W, which from thence extends downward, and is connected with, and forms part of, a strap, $w$, that encircles an eccentric, X, which is secured upon and revolves with the driving-shaft M. To the lower end of the lever V is pivoted one end of a bar, Y, which from thence extends forward and has its opposite end pivoted upon an arm, $t''$, that extends laterally outward from the rear end of the shuttle-carrier T. If, now, the driving-shaft M is caused to revolve, the shuttle-carrier T will be moved back and forth within the shuttle-race S, the relative positions of parts between the rear and forward limits of motion of said carrier being shown in Figs. 9 to 12.

When the shuttle-carrier moves forward, the lower end of the lever V, which is then below the former, rises as it advances, and thus lessens the velocity with which it moves said carrier, while upon the return movement the end of said lever is not only passing rearward but downward, and causes said carrier to pass quickly from the front to the rear limit of its stroke, the time required for such rearward movement being but about one-half that which is occupied by the forward movement of said carrier.

In consequence of the unequal velocity of the shuttle-carrier upon its forward and rearward movements, the shuttle is caused to pass more quickly through the loop than would otherwise be possible where a continuous movement of a crank or an eccentric is employed.

The feed-bar Z has the form in side elevation seen in Fig. 14, its engaging portion $z'$ being serrated upon its upper side and provided with a longitudinal slot, $z$, for the passage of the needle, while from the rear end of said serrated portion said bar extends downward below the base-plate A, thence horizontally rearward for a short distance, and from thence rearward to its end is flattened horizontally, and has such flattened portion dropped downward, as shown in said figure.

The serrated portion $z'$ of the feed-bar Z is contained within a corresponding opening in the base-plate A, and is free to move longitudinally the necessary distance, while the portion below said plate is contained within a housing, A', which is secured upon the lower side of said base-plate, and is provided with a groove, $a'$, that receives the end of said bar and enables it to move freely vertically and longitudinally.

Longitudinal motion is imparted to the feed-bar Z by means of the following-described mechanism: Within a suitable groove that is formed in the lower side of the base-plate A is a flat bar, D', that is capable of sliding freely lengthwise nearly in a line with the shuttle-race. At its rear end this bar B' is provided with a block, $b'$, that is pivoted in said end, and has one of its ends flattened to enable it to fit into a narrow slot, $w'$, which extends lengthwise of the bar W, the arrangement being such as to cause said bar B' to reciprocate longitudinally by the forward and backward motion of said bar W as the eccentric X revolves.

From the front end of the bar B' an arm, $b''$, extends laterally toward the front side of the machine, and to its end has pivoted one end of a bar, C', which from thence extends forward within a groove in the base-plate A into the housing A', above the feed-bar Z and immediately in rear of the vertical portion of the same.

Within the edge of the bar C', toward the rear side of the machine, is formed a recess, $c'$, which at its front end has a forward and an outward sloping face, which inclined face, and the edge of said bar between the same, and the forward end of said bar bear against a roller, D', that is pivoted within one end of a bar, E', which extends forward within the housing A', in a line with the feed-bar Z, and is capable of longitudinal adjustment by means of a screw, F', that is swiveled within the downward-projecting edge of the base-plate A, and has its threaded end contained within a correspondingly-threaded axial opening in said bar.

The feed-bar Z is pressed against the bar C', and the latter held with a yielding pressure against the front side of its groove by means of a spring, G', so that when said bar C' is caused to reciprocate longitudinally by the movement of the bar B', its recess $e'$ will be brought opposite to the roller D' each time said bar moves forward.

If, now, the roller D' is moved inward until its periphery enters the groove which contains the bar C', each rearward movement of the latter will cause the inclined face of its recess $c'$ to be brought into contact with said roller, and thereby said bar C', with the feed-bar Z, will be moved toward the rear side of the machine, the degree of such motion being governed by the distance to which said roller extends into said groove. Upon the return movement of said bar C' the inclined face of its recess $c'$ will pass out of engagement with said roller D', when the spring G' will move said bar and said feed-bar to their normal positions once more.

Vertical motion is imparted to the feed-bar Z by the following-described means: Journaled at one end within a bearing at or near the rear end of the base-plate A, and at its opposite end within the housing A', is a shaft, H', which at its front end is provided with a crank-arm, $h$, that extends toward the front side of the machine beneath the horizontally-flattened portion of the feed-bar Z, and at its outer end is provided with a roller, $h'$.

At the rear end of the shaft H' is a second crank-arm, $h''$, which extends laterally toward the rear side of the machine, and then downward in rear of the driving-shaft M, and adjacent to the inner face of the disk O, at which point said crank-arm is provided with a roller, $h'''$, that has its axis parallel with said face.

Within and upon the inner face of the disk O is formed a cam-track, $o'$, upon which rests the roller $h'''$, said track having such relative elevation above and depression below the face of said disk as to impart to the crank-arm $h''$, and through the same and the shaft H' to the crank-arm $h$, sufficient motion to cause the outer end of the latter to raise the feed-bar to the desired height above the needle-plate.

The shape of the cam-track $o'$ and the position of its elevated portion with relation to the crank-pin $o$ causes the feed-bar to rise at the commencement of its rearward movement, and to remain in such elevated position until it has reached the limit of motion in such direction, while, during the forward motion of said feed-bar, the elevating mechanism is motionless.

In order that the feed-bar Z may preserve its horizontality during its movements, its rear portion is provided with a slot, $z''$, as seen in Fig. 14, and receives a pin, $z'''$, that passes through said slot and through the contiguous portions of the housing A'. As thus arranged a forward movement of said feed-bar will cause its rear end to rise at the same time and to the same height as the front end.

The upper thread, I', is fed from a spool which is placed over a stud, K', that extends upward from the rear portion of the stationary arm C', from which spool said thread passes forward and then upward beneath a plate, L', that is fitted loosely into a horizontally-grooved plate, M', which is secured upon the side of the head D next to said spool, and at the upper end of said head.

The plate L' is held with a yielding pressure within its groove by means of a screw, N', which passes horizontally through said parts, and upon its outer end is provided with a thumb-nut, $n'$, and at its inner end has, upon opposite sides, narrow vertical grooves that receive the forked end of a flat spring, O'. From said screw N' said spring O' extends downward to or near the lower end of the head D, and has its lower end contained within a correspondingly-shaped recess which is formed within the contiguous sections of said head, the lower screw, $d''$, of said head passing through an opening in the lower end of said spring.

The spring O' has such shape longitudinally as to cause its upper end to draw inward upon the screw N' so as to hold the plate L' against the plate M' with a yielding pressure, the degree of which pressure is governed by the position of the nut $n'$. By turning said nut in one direction such pressure is increased, while, by turning it in an opposite direction, the pressure will be lessened, the result of which pressure is to give to the thread I' such tension as may be necessary in order to permit of the formation of a perfect stitch.

A notch, $m'$, is provided within the upper of the flanges which form the groove of the plate M', through which the thread I' passes upward, while a notch, $l'$, within the lower edge of the plate L' receives said thread from the spool.

From the tension device described the thread passes upward through an eye, $e''''$, which is provided upon the front side, at the upper end of the needle-bar E; from thence downward to and through a second eye, $d'''$, which projects from the front side, below the vertical center of the head D; from thence rearward and downward through a third eye, P'', that projects forward from a take-up, (hereinafter described;) thence forward and downward to a fourth eye, $d''''$, and from thence passes downward to and through the needle G.

The take-up P' is composed of a plate which has the form in side elevation seen in Fig. 23, and is contained within a recess that is formed in the front side of the head D, and at its inner side is near the outer face of the needle-bar E.

At its upper end the take-up P' is pivoted within its recess, while its lower end is free to move a distance slightly less than the width of the head D, which movement is effected by means of a stud, k', which extends forward from the outer side of the vibrating arm K, just in the rear of the needle-bar E, and engages with a slot, p''', that extends longitudinally from near the upper end to a point below the center of said take-up.

The upper half of the slot p''' is substantially vertical when the lower end of the take-up is at its rear limit, while from its center downward said slot has a rearward inclination.

In use the lower end of the take-up P' is at the forward limit of its motion when the needle is at its lowest point, and as said needle rises said take-up moves rapidly rearward, and reaches the rear limit of its motion just before said needle emerges from the fabric being operated upon, from which time until said needle reaches the same point upon its downward movement said take-up remains stationary, and then moves rapidly forward to its forward limit of motion.

The operation of the take-up being independent of springs is positive, and its retraction of the thread is thus uniform—a result which could not be secured by the use of a spring take-up, or of a spring for moving the take-up rearward.

The recess within the head D in which is placed the take-up P' is inclosed by means of a plate, Q', that is let into the face of said head, and is secured in position by means of two screws, q and q', placed at its upper and lower ends. A slot, q'', near its lower end enables the eye p'' of said take-up to pass outward.

The slack of the upper portion of the thread caused by the downward movement of the needle-bar is taken up by a light spring, R', which is secured upon the side of the covering-plate Q', and, extending upward, is provided at its upper end with a hook, r', that engages with said thread between the tension and said needle-bar, said spring being so arranged as to cause its upper end to draw said thread rearward.

The presser-bar F corresponds in size and shape to the like feature of the needle-bar E, and is contained in a groove, d', in the rear side of the head D. Downward pressure is given to said bar by means of a spiral spring, S', which is contained between a lug, f, that extends inward from the inner face, near the longitudinal center of said bar, and a block, T', which is placed at some distance above the same.

The block T' is moved vertically by means of a rod, U', which is swiveled within the upper end of the head D, and passes downward through said block, the spring S' and the lug f, and for some distance above and below said block is provided with a screw-thread, which corresponds to a threaded opening in the latter.

The block T' is prevented from revolving with the rod U' by means of a lug, t''', which extends rearward into a vertical groove, d''''', that is provided within the contiguous portion of the head D.

The construction described gives to the presser-bar F a direct downward pressure, which may be varied at will by turning the screw-rod U', for which purpose the upper end of said rod is provided with a milled head, u'.

The presser-bar F is raised to and locked in an elevated position by means of a cam-lever, V', which is pivoted within the head E, and works in a notch, f, that is formed in the edge of said bar.

The presser-foot W' has the usual form, and at its upper end is provided with flanges w'''', which embrace the edges of the presser-bar F, as seen in Figs. 24 and 25.

Upon the rear face of the presser-foot W' is provided a lug, w'', which extends through a corresponding opening, f'', in the presser-bar F, and is provided with a horizontal threaded opening, w''', that is but one-half outside of the face of said presser-bar.

Between the opening f'' and the rear edge of the presser-bar F is provided a half-round groove, f''', which permits of the insertion within the threaded opening w'''' of the lug w'' of a screw, X', which has a pointed end, which end, when caused to project through said lug, bears upon the rear side of said presser-bar contiguous to said opening f'', and, operating as a wedge, draws the presser-foot firmly against the front side of said presser-bar.

The means employed for securing the presser-foot in position is simple, efficient, and easily manipulated, and may also be employed for connecting other attachments to or with the presser-bar.

The shaft P and the lever V are each provided with axial bearings, which, as lost motion is caused by wear, may be made close, and as good as when new.

Through each of said parts passes a screw, Y', Fig. 26, that at one end is provided with a screw-thread, y, from whence toward the head y' said screw is parallel and plain for a distance equal to the length of the part to be pivoted, and terminates in an outwardly-inclined shoulder, y'', from whence, to said head said screw is plain.

One end of the part P or V is made conical, and fits into a corresponding recess in the adjacent support, while within its opposite end the opening through which passes the screw Y' is enlarged and made to conform to the shoulder y''. The part P or V being now placed in position with its conical end within the recess prepared for it, the screw Y' is inserted and turned inward until its shoulder y'' bears within its recess with sufficient firmness to prevent end motion of said pivoted part, and causes the principal wear to be upon said conical bearings.

Between the head y' of the screw Y' and the part through which said screw passes is placed a washer, $y'''$, of soft metal, which has such thickness as to permit said screw to pass inward the precise distance necessary before said head has a firm bearing. When the pivoted part has become worn, so as to allow of end motion, by removing said screw and filing a little from the face of said washer, said screw will be enabled to pass farther inward, and, by bringing its conical shoulder $y''$ nearer to the conical bearing for the rear end of the pivoted part, render the latter as firm as before.

Having thus fully set forth the nature of my invention, what I claim as new is—

1. As a means for operating the vibrating arm K, and in combination therewith, the shaft M, provided with the disk O and crank-pin $o$, the shaft P, having the radial arm $p$, provided with the slot $p'$, the sliding block Q, fitted within said slot and over said crank-pin, and the connecting-bar R, pivoted at its ends to or upon the lower end of said vibrating arm K and the outer end of said slotted arm $p$, said parts being combined to operate in the manner and for the purpose substantially as specified.

2. As a means for operating the shuttle-carrier T, and in combination with the same, the lever V, pivoted at its upper end within the hollow boss B, the bar W, connected at its lower end with and forming part of the eccentric strap $w$, and having its upper end pivoted to said lever in front of and below the pivotal bearing of the same, the eccentric X, secured upon and revolving with the shaft M, and the bar Y, pivoted upon and extending between the lower end of said lever and the rear end of said carrier, said parts being combined to operate in the manner and for the purpose substantially as shown.

3. As a means for imparting longitudinal motion to the feed-bar Z, and in combination therewith, the eccentric X, the strap $w$, the bar W, provided with the longitudinal slot $w'$, the pivoted block $b'$, the bar B', having the angular arm $b''$, the pivoted bar C', engaging with a shoulder of said feed-bar, and provided with the cam-recess $c'$, which engages with a bearing, D', said parts being combined to operate in the manner and for the purpose substantially as set forth.

4. As a means for imparting vertical motion to the feed-bar Z, the shaft H', journaled lengthwise of and below the base-plate A, provided at its front end with a crank-arm, $h$, which extends beneath said feed-bar, and having at its rear end a second crank-arm, $h''$, that at its end engages with a cam-track, $o'$, which is formed within the inner face of the plate or disk O, said parts being combined to operate in the manner and for the purpose shown and described.

5. As a means for regulating the longitudinal motion of the feed-bar Z, the bar E', provided at its inner end with a roller, D', and capable of adjustment toward or from the cam-recess $c'$ of the bar C' by means of the screw F', said parts being combined to operate in F', said parts being combined to operate in the manner and for the purpose substantially as specified.

6. As a means for giving to the tension-plate L' a yielding pressure against the plate M', the flat spring O', contained within the head D, having its lower end secured in position between the sections of said head and its upper end forked, the screw N' passing through said tension-plate, and at its inner end in engagement with the forked end of said spring, and the thumb-nut $n'$, placed upon the outer end of said screw, said parts being combined to operate in the manner and for the purpose substantially as shown.

7. As a means for taking up the slack of the thread, the head D, provided with the thread-eyes $d'''$ and $d''''$, the vibrating arm K, having near its outer end the stud $k'$, and the plate P, pivoted at its upper end within or upon the upper rear portion of said head, provided at its lower end with a thread-eye, $p$, and having a longitudinal slot, $p'$, which extends downward and then rearward and downward, and engages with said stud $k'$, said parts being combined to operate in the manner shown, so that the said thread-eye $p$ is caused to move forward in a line parallel with the length of the machine while said vibrating arm K is passing from the center of oscillation to the lower limit of its motion, and to move rearward as said vibrating arm rises to its center of oscillation, substantially as and for the purpose set forth.

8. As a means for giving to the presser-bar F a downward yielding pressure, the spiral spring S', resting upon the lug $f$ of said bar, the block T', placed at the upper end of said spring and provided with a radial lug, $t'''$, which engages with a vertical groove, $d''''$, which is formed in the head D, and the threaded rod U', that passes downward through said head, said block T', said spring S', and said lug $f$, said parts being combined to operate in the manner and for the purpose substantially as shown and described.

9. As a means for connecting the presser-foot W' to or with the presser-bar F, and, in combination therewith, the interiorly-threaded lug $w'''$, projecting rearward from the former through the opening $f''$ in said presser-bar, and the pointed screw X', which passes through said lug and fits within a half-round groove, $f'''$, in said presser-bar, in the manner and for the purpose substantially as specified.

In testimony that I claim the foregoing I have hereunto set my hand this 9th day of October, 1877.

JAMES McALLISTER.

Witnesses:
EDWARD COOK,
L. I. COULTER.